United States Patent [19]
Webber

[11] Patent Number: 5,909,570
[45] Date of Patent: Jun. 1, 1999

[54] TEMPLATE MAPPING SYSTEM FOR DATA TRANSLATION

[76] Inventor: David R. R. Webber, 6811 Kenilworth Ave., Riverdale, Md. 20737

[21] Appl. No.: 08/868,837

[22] Filed: Jun. 9, 1997

Related U.S. Application Data

[63] Continuation of application No. 08/348,877, Nov. 30, 1994, abandoned, which is a continuation-in-part of application No. 08/174,872, Dec. 28, 1993, abandoned.

[51] Int. Cl.$^6$ ........................................................ G06F 3/00
[52] U.S. Cl. .............................................. 395/500; 707/4
[58] Field of Search ........................... 1/1; 345/333, 121, 345/326, 339, 340; 707/503, 504, 4; 395/500; 364/578, 282.1, 282.2

[56] References Cited

U.S. PATENT DOCUMENTS

| | | | |
|---|---|---|---|
| 5,410,675 | 4/1995 | Shreve et al. | 395/500 |
| 5,416,917 | 5/1995 | Adair et al. | 395/500 |
| 5,442,783 | 8/1995 | Oswald et al. | 395/600 |
| 5,450,581 | 9/1995 | Bergen et al. | 355/600 |
| 5,475,836 | 12/1995 | Harris et al. | 395/600 |
| 5,557,780 | 9/1996 | Edwards et al. | 395/500 |

*Primary Examiner*—Kevin J. Teska
*Assistant Examiner*—A. S. Roberts
*Attorney, Agent, or Firm*—Venable, Baetjer, Howard & Civiletti, LLP

[57] ABSTRACT

An improved method and architecture for mapping data between fixed structure datasets defined by different computer formats. The method employs a simple intuitive mapping template which operates from an embedded knowledge of the structure rules for the data being exchanged. The mapping template is flexible and allows the details of the data manipulation required for translation to be expressed by a layperson, and without the requirement that they define the entire message structure in every detail. It is also possible for the mapping template(s) themselves to be transmitted along with the datasets to facilitate conversion between data formats.

14 Claims, 20 Drawing Sheets

```
                    Field definition table components

┌──────────┐      % Field descriptions for EDI 856 Flatfile processing
│  Table   │      %
│definition│      % This table is only normally required for Flatfiles and Btrieve,
│   150    │      % since for other tables the field definitions are dynamically read in.
└────┬─────┘      %
     │            % The following rules apply to the field entries.
┌────┴─────┐      % Max Field Size is required,
│ Comments │      % Format              , default is AN - Alphanumeric, other values
│  & Notes │      %                       are NM - Numeric, and NZ - Numeric zero fill.
│   200    │      % Justify             , default is L - Left for AN, Right for Numeric.
└────┬─────┘      %
     │            %   Item     Field Name       , Max Field Size  , Format , Justify
┌────┴─────┐      %  --------  ------------------------------------------------------
│  Table   │
│Description       TABLE    : Manifest History, SQL_MNFST_HIS
│   300    │
└────┬─────┘      FIELDS   : mnfst_no           ,  10
     │                       generator_ID       ,  12
     │                       Transport1_ID      ,  12
     │                       Transport2_ID      ,  12
     │                       TSDF_ID            ,  12
     │                       reference_mnfst    ,  10
     │                       date_gen_ship      ,   6
┌────┴─────┐                 Trans1_SWA_Dcal    ,   6
│  Field   │                 Trans1_ship_dte    ,   6
│Description                 Trans2_SWA_Dcal    ,   6
│   400    │                 Trans2_ship_dte    ,   6
└──────────┘                 TSD_recv_date      ,   6
                             Reject_flag        ,   1
                             Reject_reason      ,  30
                             Batch_number       ,   8            , NZ TABLE    : Manifest Summary , SQL_MNFST_SUMM FIELDS   : mnfst_no           ,  10
                             line_no            ,   1
                             waste_code         ,   4
                             quantity           ,   5            , NZ
                             qnty_units         ,   1
                             handling_code      ,   3
                  %  ------------------------------------------------------
```

FIG. 3

```
Example Mapping Template and Components                                              Comments % Incoming EDI 856 processing:
%
% Field assignment decode rules:
%      &n          - parameter number passed to process.
%      &&xxxxx     - parameter returned by called function.
%      M1001       - value from EDI segment element
%      'xxx'       - constant value
%      @function name() - invoke special macro process -call function with parameters and return value
%      Special handling for HL loops - X. prefix, where X. denotes the identifying letter for that HL loop
%         as specified by the HL_KEYS statement.
%      Loop occurence designator - name:2 denotes the second occurence of this value.

TABLE    : MANIFEST_HISTORY, SQL_MNFST_HIS, ORACLE, SQL_HIST_INDX       Table Identifier
INDEX    : UNIQUE, mnfst_no                                             and Index details
EDI_KEY  : BSN02
HL_KEYS  : HL03 = 'S', HL03 = 'V'

FIELDS   : mnfst_no            □,   BSN02
           generator_id□       □,   @IF(S.N101 = 'SF') S.N104                    Field
           Transport1_id       □,   @IF(S.N101 = 'OC') S.N104                    Assignments
           Transport2_id       □,   @IF(S.N101 = 'OC') S.N104                    and
           TSDF_id□            □,   @IF(S.N101 = 'MA') S.N104                    Operations
           refrence_mnfst      □,   @IF(V.LIN03 = '16') V.DTM02, @MAP(YYMMDD | MMDDYY)
           date_gen_ship       □,   @IF(S.REF01 = '47') S.REF02
           Trans1_SWA_Dcal    □□,   &&edi_valid_flag
           Reject_flag         □,
           Reject_reason      □□,   @NEXTVAL1
           Batch_number       □□,   ST02
           tscn                □,   &1
           ts_id              □□,   @DYYMMDD
           ts_date            □□,   @THHMMSS
           ts_time            □□,
           edi_valid_flag      □,   'Y' or 'W' or 'E'
```

FIG. 4A

```
TABLE    : MANIFEST SUMMARY  , SQL_MNFST_SUMM, ORACLE, SQL_SUMM_INDX  ⎫
INDEX    : UNIQUE, mnfst_no                                           ⎪
FIELDS   : mnfst_no         □,   BSN02                                ⎪  Multiple table
           line_no           □□, I.LIN01                              ⎬  definitions in one
           waste_code         □, @IF(I.PID01 = 'S' & I.PID03 = 'EP') I.PID04   template
           quantity          □□, I.TD107                              ⎪
           qnty_units       □□,  I.TD108, @XLATE1                     ⎪
           handling_code     □,  I.TD403                              ⎭

% Lookup Rules: (can be another table, or ASCII flat file list)          ←── Comments
%
%              Table             DB type      Lookup Field(s)     Use Index
%              ─────────────────────────────────────────────────────────────
@LOOKUP1 : OMS_CARRIER             , ORACLE,  CARR_CODE,          CARIERX   ⎫
@LOOKUP2 : c:\system\tables\codes.dat                                       ⎬ Lookup table
@XLATE1  : c:\pdc\edi856a.xlt                                               ⎭ definitions

@NEXTVAL1 : OMS_NEXT_KEY           , NATIVE,  NEXT_KEY,           NXTKEYX
```

FIG. 4B

Example EDI message - simple looping

```
ST*323*712990413
V1*7039610*NEW ZEALAND QUEEN*D*104N*SCAC***L
LS*0100
R4*D*D*JAX*JACKSONVILLE FL****
V9*EAD**920819**JACKSONVILLE FL***A26
R4*D*D*ORF*NORFOLK, VANORFOLK INTL TERMIN
V9*EAD**920817**NORFOLK, VA***A26
R4*L*K*MEB*MELBOURNE,  AUST****
V9*EDD**920712**MELBOURNE,  AUST***A40
R4*L*K*SYD*SYDNEY,   AUST****
V9*EDD**920715**SYDNEY,  AUST***A40
R4*L*K*WLG*WELLINGTON, NEW ZEALAND****
V9*EDD**920721**WELLINGTON, NEW  ZEA***A40
LE*0100
SE*25*712990413
```

FIG. 6

Example EDI Message - implied looping

```
ST*309*230246880
M10*SEAU*O*US*8212661*GALVESTON BAY*252E**78*E*B*Y
LS*0101
P4*1601*921020*19
LS*0102
LX*000000
M11*707012737*01601*10*LVN*14248*L*2066*E*00*SEAU
MSN*SI*22162525400-707012737***G
LS*0103
N1*SH*NORTH AMERICAN VAN LINES,
N3*INC. INTERNATIONAL DIVISION*P.O. BOX 988
N3*FT. WAYNE, INDIANA 46801*BREMEN 1, WEST GERMANY
N1*CN*WILHELM ROSEBROCK
N3*POSTFACH 102127*2850 BREMERHAVEN, GERMANY
N1*N1*PHOENIX TRANSPORT SERVICES
N3,P.O.BOX 12 04 52
LE*0103
LS*0103
VID*CN*SEAU*409022*279465
N10*10*LIFTVANS USED MILTIARY*CONTAINER
#*J*4444444444*3025*L*14248
N10**HOUSEHOLD GOODS AND PERSONAL*ETD: 10/12/92
N10**EFFECTS*ETA: 10/24/92
LE*0103
LX*000000
M11*707012812*01601*16*LVN*12032*L*1750*E*00*SEAU
MSN*SI*22162525400-707012812***G
LS*0103
N1*SH*ART INTERNATIONAL
N3*FORWARDING, INC.*6746 WYNFIELD TERRACE DRIVE
N3*ST. LOUIS, MISSOURI 63129*BREMEN 1, WEST GERMANY
N1*CN*WILHELM ROSEBROCK
N3*POSTFACH 102127*PHOENIX TRANSPORT SERVICES
N1*N1*EXPRESS TRANSPORT SERVICES
N3*GMBH
LE*0103
LS*0103
VID*CN*SEAU*403824*279483
N10*16*LIFTVANS USED MILITARY*CONTAINER
#*J*4444444444*3025*L*12032
N10**HOUSEHOLD GOODS AND PERSONAL*ETD: 10/12/92
N10**EFFECTS*ETA: 10/24/92
LE*0102
LE*0101
SE*0071*230246880
```

FIG. 7

Example translation template - implied looping

```
% 309 C2/9 - U.S. Customs Manifest
%
% Incoming 309 processing:
%
% Item        Details
% ---------   ------------------------------------------------------------
  TABLE     : Manifest header, SQL_MNFST_HDR, ORACLE, SQL_MNFST_INDX
  INDEX     : UNIQUE, mnfst_no
  EDI_KEY   : M1006,P401

FIELDS    : mnfst_no          , M1007
              tscn              , ST02
              origin            , 'D'
              status            ,
              mnfst_type        , M1009
              carr_code         , M1001    , @LOOKUP1
              vsl_id            , &&vsl_id, @CALL1
              lloyds_reg_code   , &&lloyds
              voy_no            , M1006
              to_pc             , P401
              ts_id             , &1
              ts_date           , @DYYMMDD
              ts_time           , @THHMMSS
              edi_valid_flag    , 'Y' or 'W' or 'E'

TABLE     : Bill Detail   , SQL_MNFST_DETAIL, ORACLE, SQL_MDTL_INDX
  INDEX     : UNIQUE, mnfst_no
  EDI_KEY   : M1006, P401, M1101

FIELDS    : bl_key            , @NEXTVAL1
              voy_no            , M1006
              frm_pc            , M1102
              to_pc             ,
              issuer            , M1112
              bill_of_lading    , M1101
              status            , M1109
              fnl_dest_pc       ,
              us_export_pc      , P401
              export            , 0
              shpmnt_type       , VID01, @XLATE1
              shpmnt_dscrpt     ,
              weight            , M1105
              weight_units      , M1106
              volume            , M1107
              volume_units      , M1108
              orig_qnty         , M1103
              qnty_units        , M1104
              hzrd_cargo        ,
              pre_carr_rcpt     , M1110
              it_no             ,
              carr_code         , VID02
              bl_error_key      , @NEXTVAL2
              ts_id             , &1
              ts_date           , @DYYMMDD
              ts_time           , THHMMSS
              edi_valid_flag    , 'Y' or 'W' or 'E'
% ------------------------------------------------------------------------
```

FIG. 8A

```
% Lookup Rules: (can be another table, or ASCII flat file list)
%             Table              DB Type      Lookup Field(s)      Use Index
%             ----------------------------------------------------------------
@LOOKUP1   : SQL_CARRIER       , ORACLE,    CARR_CODE,            CARIERX
@XLATE1    : c:\edi309a.xlt
@NEXTVAL1  : SQL_NEXT_KEY      , NATIVE,    NEXT_KEY,             NXTKEYX
@NEXTVAL2  : SQL_NEXT_KEY      , NATIVE,    NEXT_KEY,             NXTKEYX
@CALL1     : ([M1004, M1005], [&&vsl_id, &&LLOYDS], [@RECONCIL1, @RECONCIL2])
@RECONCIL1: SQL_VSL            , NATIVE,    VSL_ID,LLOYDS         VSLIDX
@RECONCIL2: SQL_VSL            , NATIVE,    LLOYDS, VSL_ID        LLYIDX
```

FIG. 8B

Example EDI message - complex looping

```
ISA~00~           ~00~           ~11~TEST          ~99~TESTING
    ~931019~1502~U~00200~000000006~0~P~<※
GS~SH~TEST       ~TESTING     ~931019~1502~3~X~003030※
ST~856~0003※
BSN~00~PAC3831295~931019~1430※
NTE~OTH~EMERGENCY RESPONSE #708-888-4660 SKDOT# A:501※
HL~1~0~S~1※
REF~MA~25029※
N1~SF~BAUM PRINTING INC.~FA~PAD002288298※
N3~9985 GANTRY RD※
N4~PHILADELPHIA~PA~19115※
PER~SA~RON PHILLIPS~TE~215-671-9500※
N1~OC~SAFETY-KLEEN CORP~FA~ILD051060408※
PER~FC~~TE~215-736-8699※
N1~MA~SAFETY-KLEEN CORP.~FA~PAD987266715※
N3~77 CANAL RD※
N4~FAIRLESS HILLS~PA~19030※
PER~RE~~TE~215-736-8699※
HL~2~1~I~0※
LIN~A~CN~WASTE PETROLEUM NAPTHA※
PID~S~HZ~UQ~UN1255※
PID~F~HZ~~~COMBUSTIBLE LIQUID (D001) (ERG #27)※
PID~X~64~EP~D018~PHYSICAL STATE L※
PID~S~64~EP~D039※
TD1~DRM52~2~~~~N~172~LB※
HL~3~1~V~0※
LIN~~A7~19※
DTM~007~910404※
N1~SF~BAUM PRINTING INC~1~PAD002288298※
REF~PN~FUBAR※
PER~CE~STEVE GORDON※
HL~4~1~V~0※
LIN~~A7~17※
DTM~007~910404※
N1~OC~SAFETY-KLEEN CORP~1~ILD051060408※
REF~PN~WHOOPS※
PER~CE~MIKE MIKSA※
HL~5~1~V~0※
LIN~~A7~20※
DTM~007~910404※
N1~MA~SAFETY-KLEEN CORP~1~PAD987266715※
REF~PN~OHNO※
PER~CE~LOUISE DE FONTENY※
CTT~5※
SE~42~0003※
GE~1~3※
IEA~1~000000006※
```

FIG. 9

Example translation template - complex looping

```
% Incoming EDI 856 processing:
%
% Item     Details
% ------   -----------------------------------

TABLE   : Manifest History,SQL_MNFST_HIS,ORACLE,SQL_HIST_INDX
  INDEX   : UNIQUE,mnfst_no
  EDI_KEY : BSN02
  HL_KEYS : HL03='S',HL03='V'

FIELDS  : mnfst_no           , BSN02
            generator_id       , @IF(S.N101='SF')S.N104
            Transport1_id      , @IF(S.N101='OC')S.N104
            Transport2_id      , @IF(S.N101='OC')S.N104
            TSDF_id            , @IF(S.N101='MA')S.N104
            reference_mnfst    ,
            date_gen_ship      , @IF(V.LIN03='16')V.DTM02,@MAP(YYMMDD|MMDDYY)
            Trans1_SWA_Dcal    , @IF(S.REF01='47')S.REF02
            Trans1_ship_dte    , @IF(V.LIN03='17')V.DTM02,@MAP(YYMMDD|MMDDYY)
            Trans2_SWA_Dcal    , @IF(S.REF01='TR')S.REF02
            Trans2_ship_dte    , @IF(V.LIN03='18')V.DTM02,@MAP(YYMMDD|MMDDYY)
            TSD_recv_date      , @IF(V.LIN03='20')V.DTM02,@MAP(YYMMDD|MMDDYY)
            Reject_flag        ,         &&edi_valid_flag
            Reject_reason      ,
            Batch_number       , @NEXTVAL1
            tscn               , ST02
            ts_id              , &1
            ts_date            ,         @DYYMMDD
            ts_time            ,         @THHMMSS
            edi_valid_flag     , 'Y' or 'W' or 'E'

TABLE   : ManifestSummary,SQL_MNFST_SUMM,ORACLE,SQL_MM_INDX
  INDEX   : UNIQUE,mnfst_no

EDI_KEY : BSN02,HL03,I.LIN01
  HL_KEYS : HL03=T

FIELDS  : mnfst_no           , BSN02
            line_no            ,         I.LIN01
            waste_code         , @IF(I.PID01='S'&I.PID03='EP')I.PID04
            quantity           ,         I.TD107
            qnty_units         ,         I.TD108,@XLATE1
            handling_code      , I.TD403
            ts_id              ,         &1
            ts_date            ,         @DYYMMDD
            ts_time            ,         @THHMMSS
            edi_valid_flag     , 'Y' or 'W' or 'E'

% -------------------------------------------
%
%Lookup Rules:(can be another table, or ASCII flat file list)
%
%      Table          DB type      Lookup Field(s)       Use Index
%      -------------------------------------------------------------

@XLATE1  :c:\pdc\edi856a.xlt
@NEXTVAL1 :SQL_NEXT_KEY  ,NATIVE,  NEXT_KEY,      NXTKEYX
```

FIG. 10

Example SQL output
(for the combination of the data from Fig. 7 with the mapping template shown in Fig. 8).

```
            # Insert statement for Manifest header
    INSERT INTO SQL_MNFST_HDR (
        TSCN, CARR_CODE, VOY_NO, MNFST_TYPE, TO_PC, ORIGIN, TS_ID, TS_DATE,
        TS_TIME, EDI_VALID_FLAG)

VALUES ( 230246880, 'SEAU', '252E', 'E', 1601, 'D', 'TstUser', 931223,
        153254, 'Y');

# Insert statement for Bill Detail
    INSERT INTO SQL_MNFST_DETAIL (
      VOY_NO, US EXPORT_PC, BILL_OF_LADING, FRM_PC, ORIG_QNTY, QNTY_UNITS,
      WEIGHT, WEIGHT_UNITS, VOLUME, VOLUME_UNITS, STATUS, ISSUER, SHPMNT_TYPE,
      CARR_CODE, bl_key, BL_ERROR_KEY, TS_ID, TS_DATE, TS_TIME, EDI_VALID_FLAG)

VALUES ( '252E', 1601, 707012737, 01601, 10, 'LVN', 14248, 'L', 2066,
        'E', 00, 'SEAU', 'CN', 'SEAU', 12, 13, 'TstUser', 931223, 153253, 'Y' );

# Insert statement for Bill Detail
    INSERT INTO SQL_MNFST_DETAIL (
     VOY_NO, US_EXPORT_PC, BILL_OF_LADING, FRM_PC, ORIG_QNTY, QNTY_UNITS,
     WEIGHT, WEIGHT_UNITS, VOLUME, VOLUME_UNITS, STATUS, ISSUER, SHPMNT_TYPE,
     CARR_CODE, bl_key, BL_ERROR_KEY, TS_ID, TS_DATE, TS_TIME, EDI_VALID_FLAG )

VALUES ( '252E', 1601, 707012812, 01601, 16, 'LVN', 12032, 'L', 1750,
         'E', 00, 'SEAU', 'CN', 'SEAU', 14, 15, 'TstUser', 931223, 153253, 'Y' );
```

(for the combination of the data from Fig. 9 with the mapping template shown in Fig. 10).

```
            # Insert statement for Manifest History
    INSERT INTO SQL_MNFST_HIS (
        TSCN,mnfst_no,GENERATOR_ID,TRANSPORT1_ID,TRANSPORT2_ID,
        TSFD_EPA,DATE_GEN_SHIP,TRANS1_SWA_DCAL,TRANS1_SHIP_DTE,
        TRANS2_SWA_DCAL,TRANS2_SHIP_DTE,TSD_RECV_DATE,BATCH_NUMBER,
        TS_ID,TS_DATE,TS_TIME,EDI_VALID_FLAG )

VALUES (
        0003,'PAC3831295','PAD002288298','ILD051060408','ILD051060408',
        'PAD987266715',040491,'A12345',040791,'','',041291,123,
        'TstUser',931223,153103,'y' );

# Insert statement for Manifest Summary
    INSERT INTO SQL_MNST_SUMM (
        mnfst_no,LINE_NO,QUNATITY,QNTY_UNITS,WASTE_CODE,
        TS_ID,TS_DATE,TS_TIME,EDI_VALID_FLAG )

VALUES (
        'PAC3831295','A',172,'P','D039','TstUser',931223,153103,'Y' );
```

FIG. 11

Example Flatfile output and associated field definition table.

(results are from combination of the data from Fig. 9 with template from Fig. 10 and Table definition from Fig. 3)

Example flatfile output

```
PAC3831295PAD002288298ILD051060408ILD051060408PAD987266715040491
A12345040791     04129100000124
PAC3831295AD03900172P
```

NOTE: data is shown above with line wraps, as paper page size is only 80 characters.

(Detail from Fig. 3 is reproduced here for reference purposes).

```
% Field descriptions for EDI 856 Flatfile processing
%
% This table is only normally required for Flatfiles and Btrieve,
% since for other tables the field definitions are dynamically read in.
%
% The following rules apply to the field entries.
% Max Field Size is required,
% Format                  , default is AN - Alphanumeric, other values
%                           are NM - Numeric, and NZ - Numeric zero fill.
% Justify                 , default is L - Left for AN, Right for Numeric.

%   Item      Field Name        ,  Max Field Size ,  Format  ,  Justify
%   --------  -----------------------------------------------------------

TABLE   : Manifest History, SQL_MNFST_HIS

FIELDS  : mnfst_no          ,  10
              generator_ID      ,  12
              Transport1_ID     ,  12
              Transport2_ID     ,  12
              TSDF_ID           ,  12
              reference_mnfst   ,  10
              date_gen_ship     ,  6
              Trans1_SWA_Dcal   ,  6
              Trans1_ship_dte   ,  6
              Trans2_SWA_Dcal   ,  6
              Trans2_ship_dte   ,  6
              TSD_recv_date     ,  6
              Reflect_flag      ,  1
              Reject_reason     ,  30
              Batch_number      ,  8                         , NZ TABLE   : Manifest Summary , SQL_MNFST_SUMM FIELDS  : mnfst_no          ,  10
              line_no           ,  1
              waste_code        ,  4
              quantity          ,  5                         , NZ
              qnty_units        ,  1
              handling_code     ,  3
%   -----------------------------------------------------------
```

FIG. 12

Example tagged data for outbound processing.

| KEY VALUE | TAG ID | DATA VALUE |
|---|---|---|
| 7039610 | V101 | 7039610 |
| 7039610 | V102 | NEW ZEALAND QUEEN |
| 7039610 | V103 | D |
| 7039610 | V104 | 104N |
| 7039610 | V105 | SCAC |
| 7039610 | V106 | |
| 7039610 | V107 | |
| 7039610 | V108 | L |
| 7039610 | R401 | D |
| 7039610 | R402 | D |
| 7039610 | R403 | JAX |
| 7039610 | R404 | JACKSONVILLE FL |
| 7039610 | R405 | |
| 7039610 | R406 | |
| 7039610 | R407 | |
| 7039610 | V901 | EAD |
| 7039610 | V902 | |
| 7039610 | V903 | 920819 |
| 7039610 | V904 | |
| 7039610 | V905 | JACKSONVILLE FL |
| 7039610 | V906 | |
| 7039610 | V907 | |
| 7039610 | V908 | A26 |

FIG. 13

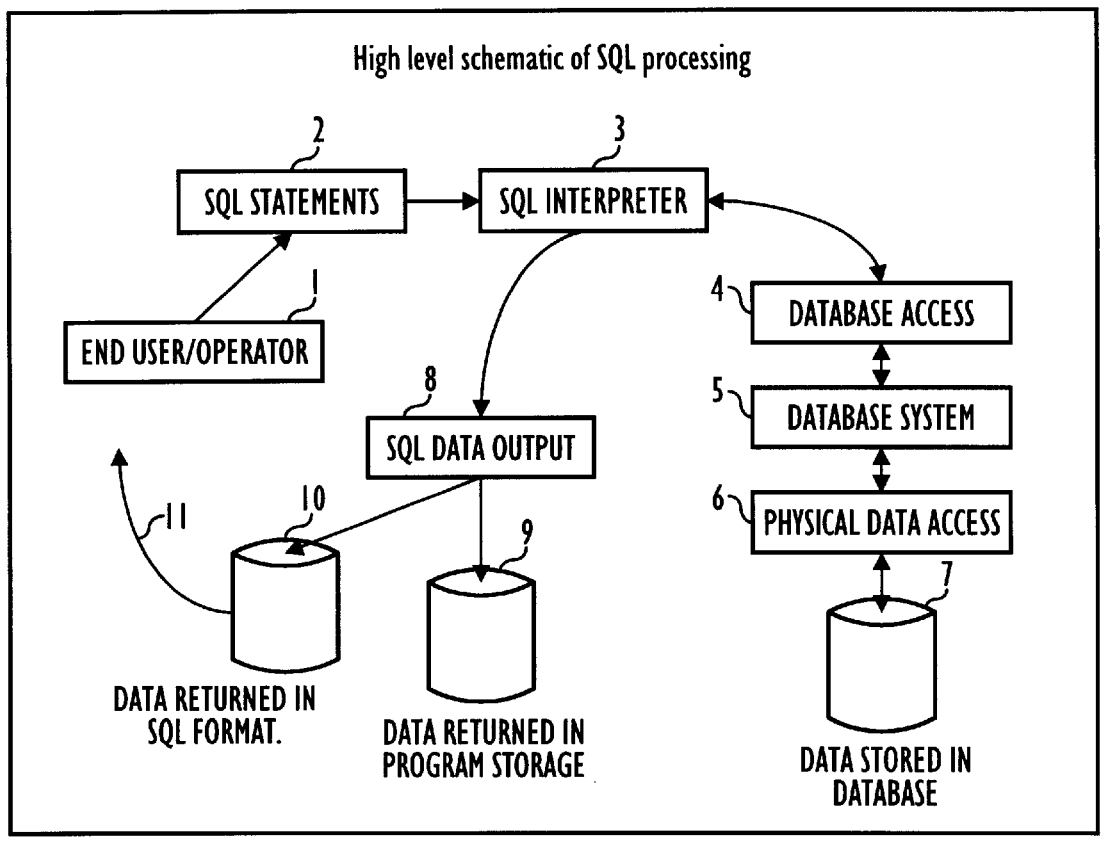

SQL provides a standard method of data access independent of specific database storage formats:
1. Human operator or computer process creates set of SQL language instructions.
2. Actual SQL language instructions to retrieve or store information in a database.
3. The SQL interpreter engine-computer software to action SQL language instructions.
4. SQL is translated in sequence of database access requests.
5. Database sub-system receives and processes access requests.
6. Physical data access locates the data within the database storage medium.
7. Database storage medium.
8. SQL interpreter builds response to SQL instructions, and formats the resultant output accordingly.
9. For direct SQL access from a program, the results are returned in program storage format via direct computer memory.
10. For human operator, or subsequent SQL interpreting, the results are returned in SQL format.
11. SQL results can be directly reviewed to determine required results.

FIG. 14

SQL language syntax components:

[Verb] [Table Object] [Condition] [Data entities (nouns)] [Physical Data]

Example:

INSERT

INTO MY_TABLE

WHERE KEY_NAME = NULL (KEY_NAME, FIRST_NAME, LAST_NAME, ADDRESS)

VALUES (

'00001', 'John', 'Doe', '11120 Empire State Building, New York');

FIG. 15

Example template derived output structure and segments.

(refer to Fig. 6 for data example, and Fig. 17 for template matching the details below)

Derived 323 structure:

| Segment ID | Name | Req Des | Max Use | Max Occurs | Loop Reference |
|---|---|---|---|---|---|
| ST | Transaction Set Header | M | 1 | 1 | 323 TSCN |
| V1 | Vessel Identification | M | 1 | | |
| LS | Loop Header | M | 1 | | |
| R4 | Port | M | 1 | 999 | |
| V9 | Event Detail | M | 999 | | |
| LE | Loop Trailer | M | 1 | | |
| SE | Transaction Set Trailer | M | 1 | | |

KEY FIELDS: V101

Template derived output segments.

```
ST,M      Derived Structure
[
143,3,3,M,ID    , SEGMENT ID
329,4,9,M,AN    , TSCN
]

V1,M
[
7,7,M,ID      , vsl_id
not used
not used
10,10,M,AN    , voy_no
4,4,M,ID      , carr_code
]

R4,M      Port Information
[
1,1,M,ID      , port_indctr
not used
10,10,M,AN    , pc
]

V9,O      Event Detail
[
3,3,M,ID      , Literal
Not used
6,6,C,DT      , port_arv_date / or dprt
4,4,C,DT      , port_arv_time / or dprt
]

SE,M      End of Set Marker
[
96,1,6,M,NO    , LINE COUNT, , , Calculated
329,4,9,M,AN   , TSCN, , , Calculated
]
```

FIG. 16

```
                    Example translation template - simple structure

% 323 C2/9 - Vessel Schedule
%
% Incoming 323 processing:
%
% Item        Details
% ---------   ---------------------------------------------------------------
%
  TABLE     : Ship Schedule Header, SQL_SS_HDR, ORACLE, SQL_SS_HDR_INDX
  INDEX     : UNIQUE, vsl_id, voy_no

EDI_KEY   : V101, V104

FIELDS    : vsl_id            ,   &&vsl_id, @CALL1
              voy_no            ,   V104
              route_no          ,   '0'
              total_days        ,   '0'
              voy_dprt_date     ,
              voy_end_date      ,
              export            ,   'I'
              carr_code         ,   V105
              ss_error_key      ,   @NEXTVAL1
              ts_id             ,   &1
              ts_date           ,   @DYYMMDD
              ts_time           ,   @THHMMSS
              edi_valid_flag    ,   'Y' or 'W' or 'E'

TABLE     : Ship Schedule Detail, SQL_SS_DETAIL,ORACLE,SQL_SS_DETAIL_INDX
  INDEX     : UNIQUE, vsl_id, voy_no, ss_seq_no

EDI_KEY   : V101, V104, R403

FIELDS    : vsl_id            ,   &&vsl_id, @CALL1
              voy_no            ,   V104
              ss_seq_no         ,   @COUNT()
              pc                ,   R403
              port_indctr       ,   R401
              port_arv_date     ,   @IF(V901 <> 'EAD') V903
              port_arv_time     ,
              port_dprt_date    ,   @IF(V901 = 'EAD') V903
              port_dprt_time    ,
              port_bl_count     ,
              mnfst_no          ,
              total_bl_count    ,
              confirm_date      ,
              confirm_time      ,
              postings          ,
              comments          ,
              ts_id             ,   &1
              ts_date           ,   @DYYMMDD
              ts_time           ,   @THHMMSS
              edi_valid_flag    ,   'Y' or 'W' or 'E'

% ---------------------------------------------------------------------------
%
% Lookup Rules: (can be another table, or ASCII flat file list)
%
%             Table              DB Type      Lookup Field(s)     Use Index
%             ---------------------------------------------------------------
@NEXTVAL1 : SQL_NEXT_KEY       ,ORACLE,      NEXT_KEY,           NXTKEYX
@CALL1    : @vslchk([V101, V102], [&&vsl_id, &&lloyds])
```

FIG. 17

List of Mapping Components

| Component | Reference | Description |
|---|---|---|
| MAPPING TEMPLATE | FIG 4. | This component controls the overall data translation process. |
| @ FUNCTIONS | FIG 4. | This component describes the types of low level data manipulations that can be employed. |
| DATA SCHEMATIC | FIG 5. | This component demonstrates the types of fixed data structures that occur in real world data, and which demonstrates different levels of complexity that the method addresses. |
| EXAMPLE EDI | FIGS 6,7. | These examples illustrate actual physical data pertaining to each of the data schematics. |
| EXAMPLE TEMPLATES | FIGS 8,10. | These examples correspond to each of the example EDI items and show how the method is applied in practice. |
| EXAMPLE SQL | FIG 11. | These examples show resultant translated output for the EDI items given as examples. |
| EXAMPLE FIELDS | FIG 3. | For databases without dynamic field definitions, and no database data formats, these must be provided by this component. |
| EXAMPLE COLUMNAR | FIG 12. | Example of a resultant data translation to a standard columnar format(widely used by mainframe and COBOL based software systems). |

FIG. 18

TEMPLATE MAPPING SYSTEM FOR DATA TRANSLATION

CROSS-REFERENCE TO RELATED APPLICATIONS

This application is a continuation of application Ser. No. 08/348,877, filed Nov. 30, 1994, now abandoned, which is a continuation-in-part of Ser. No. 08/174,872, filed Dec. 28, 1993, now abandoned.

FIELD OF THE INVENTION

This invention relates generally to electronic data interchange ("EDI") and, more particularly, to a template mapping system for dynamic and flexible dataset translation between different computer systems and data stores.

BACKGROUND OF THE INVENTION

Electronic data interchange (EDI) is the electronic exchange of business documents, such as purchase orders and invoices. EDI is widely used to facilitate business processes. For instance, documents can be sent and received immediately, and mailing costs are reduced. In addition, there is less paperwork, and improved accuracy as the result of avoiding manual data entry.

Conventional EDI is accomplished over existing communication lines between trading partners' computers. The transfer can be direct if the computers are linked directly, or asynchronously if the connection is a transient one. However, direct networks are difficult to maintain with larger numbers of trading partners. More commonly, a third-party "value-added network" (VAN) is used. VANs maintain an electronic mailbox for each trading partner that can be accessed by each other partner.

In order to ensure both the sender and recipient format data in a common mutually agreed way EDI takes place pursuant to a variety of established EDI standards. Examples of such standards (and their maintenance organizations) are the ANSI X12 standard (developed by the American National Standards Institute's Accredited Standards Committee's X12 group), the UN-EDIFACT standard (Electronic Data Interchange for Administration, Commerce, and Transport, a United Nations standard based on ANSI X12 and the Trade Data Interchange standards used in Europe), the Uniform Communications Standards ("UCS"), and TDCC (developed by the Transportation Data Coordinating Committee).

Regardless of the particular standard, all are designed around an electronic representation of a paper business document. A unique identifier code is assigned for each type of business document. For example, in the ANSI X12 standard an invoice is referred to as document number X12.2, with a transaction set identification code of 810.

The basic unit of information on the electronic document is the "data element." For the invoice, each item being invoiced would be represented by a data element. Data elements can be grouped into compound data elements, and data elements and/or compound data elements may be grouped into data segments. Data segments can be grouped into loops; and loops and/or data segments form the business document.

The standards define whether data segments are mandatory, optional, or conditional and indicate whether, how many times, and in what order a particular data segment can be repeated. For each electronic document, a field definition table exists. For each data segment, the field definition table includes a key field identifier string to indicate the data elements to be included in the data segment, the sequence of the elements, whether each element is mandatory, optional, or conditional, and the form of each element in terms of the number of characters and whether the characters are numeric or alphabetic. Similarly, field definition tables include data element identifier strings to describe individual data elements. Element identifier strings define an element's name, a reference designator, a data dictionary reference number specifying the location in a data dictionary where information on the data element can be found, a requirement designator (either mandatory, optional, or conditional), a type (such as numeric, decimal, or alphanumeric), and a length (minimum and maximum number of characters). A data element dictionary gives the content and meaning for each data element.

In general, trading partners seldom employ the same database programs and computers, and accessing and storage formats differ significantly. A structured query language (ANSI SQL) has evolved to unify the accessing method. SQL provides a standard method of data accessing independent of specific database storage formats, but this does not address structure and data differences. SQL provides a useful mechanism to illustrate the functionality of the invention and a common point of reference and understanding. FIG. 14 is a high level schematic of the steps involved in SQL processing. SQL begins with a human operator 1 or automated process creating a script of SQL instructions 2 intended to retrieve or store information in database 7. The script is executed by a conventional SQL interpreter engine 3, which in turn initiates a series of database access requests 4. The database system 5 receives and processes the requests and physically accesses the data 6 from database 7. The data is fed back to the SQL interpreter engine 3 which builds a response 8 to the SQL instructions. The resultant output is properly formatted in SQL format 10 or is input to an application 9, depending on the intended usage. It is presumed for purposes of the present patent application that the reader is familiar with the ANSI SQL programming standards and language, and its several popular commercial implementations. To help illustrate these mechanisms, FIG. 15 is a chart showing the SQL language syntax components (at top), as well as an example of a simple SQL language script for inserting data into a table.

Accessing of data via SQL methods does not address remote transfers of data from one computer to another. More is needed before the data becomes useful in this context. The data must be translated from the format of one computer system to the other so that the latter can process it accurately. Originally, translation software was developed to support a variety of private system formats. The private systems were employed by larger companies and were custom written to allow them to exchange electronic documents with selected trading partners.

Eventually, more general translation programs were developed such as TDCC (used in the transportation industry) and UCS (used in the grocery industry). These programs adapted a more flexible approach to translating documents from a variety of different systems into recognizable form. Such translators operate by extracting fixed data files from the original dataset. They manipulate the data twice, once to extract the necessary incoming data, and once to create the outgoing information and place it in the recipient data system. In extracting the inbound data, the translators converted the variable length data elements and segments in the dataset to a fixed length format that could be processed by traditional batch applications. Of course, there was no flexibility to manipulate data, rearrange data, or make up for errors in the placement of data. Often data structure clashes would occur between the data formats (a structure clash occurs when the way that the information has been distributed within the local system does not match the way it is earmarked for eventual use. These programs also required highly specific transmission standards limiting the formats by which datasets are transmitted. Most often, the sender and receiver were required to contract in advance for a tailored software program that would be dedicated to mapping between their two types of datasets. For instance, typical modern computer systems use a combination of SQL, xBase, and Btree based database storage systems. To exchange data between these systems used to require using various flatfile formats. There are four types commonly used, flatfile records, a comma delimited file, EDI formats, and SQL syntax statements (the latter incurs a very high overhead in terms of message size, and so is usually restricted to local transfers and backing up of data only). In any of the four cases, each time a new sender or receiver was added to the client list, a new translation program would need to be added to the arsenal. Of course, this becomes expensive.

Previous attempts at improving the translation process have resulted in solutions that are still cumbersome, use inefficient computer programming language syntax and structures, and still require programming staff to implement. For instance, U.S. Pat. No. 5,202,977 discloses a language based EDI translation system that receives data, executes a script to translate the data, and then transmits the data. The translation is accomplished by a script which creates two separate trees, or linked lists of storage nodes (see column 22, lines 18–26). The script populates one tree with the input data. Then, a series of assignment statements are executed to populate the second tree with the desired output data and according to the desired output format. For the reasons explained above, the fixed scripts can be cumbersome, especially for complex looping datasets. Moreover, there is no flexibility to accommodate a new data structure. In the current state of the art, existing translation systems will abort when they encounter unfamiliar data conditions. Therefore, if a new trading partner comes along a new script must be custom written prior to EDI.

It would be greatly advantageous to streamline the translation system, and to reduce it to a flexible and efficient form capable of handling diverse datasets and incongruities in the data without custom programming support, and with built-in ability to handle unfamiliar conditions.

SUMMARY OF THE INVENTION

Accordingly, it is an object of the invention to provide an improved method and architecture for mapping data between fixed structure datasets defined by different computer formats.

It is another object to provide a data translation architecture and method which employs a simple intuitive mapping template which operates from an embedded knowledge of the structure rules for the data being exchanged.

It is a further object to provide a template mapping system which allows the details of the data manipulation required for translation to be expressed and prepared by a layperson, and without the requirement that they define the entire message structure in every detail. Said layperson will manually express and prepare said mapping templates and store them to control and define the template processing required.

It is another object to provide a template mapping system in which the mapping templates themselves can be transmitted along with the datasets to facilitate dynamic conversion between data formats.

It is still another object to facilitate EDI data exchange without the need for convoluted computer language syntax.

It is a further object to allow single step (in memory) implementations that allow direct conversions between database and EDI formats.

It is still another object to allow a user to take an EDI message structure and create either a flatfile record format, a comma delimited format, or explicit dynamic SQL statements with embedded data.

It is a still further object to construct a system that lends itself to implementation with a graphical user interface (GUI) for an intuitive spreadsheet-like metaphor for the end-user. In a spreadsheet cells and functions are used to manipulate mathematical data, whereas it is envisioned that a similar type mechanism in which cells point to data elements and functions will remove the need for complex programming.

These and other objects are accomplished by a template mapping system for translating data between a first data structure and a second data structure.

The system is especially suited for electronic data interchange (EDI) between a first computer system operating with data structured according to its particular protocol, and a second computer system operating with data structured according to a second protocol. The EDI is accomplished with a mapping template incorporating commands for extracting a dataset from the first computer system (formatted in the first protocol), and for restructuring the information according to the second protocol of the second dataset. The system architecture also includes a communication line between the computer systems over which the EDI transactions take place.

The method of using the above-described architecture includes the steps of loading a mapping template that incorporates one or more table field layouts that collectively describe the first data structure and second data structure. The mapping template also includes mapping template rules that define how data is mapped between the two structures. The mapping template is applied by loading a dataset formatted according to the first data structure. Then by identifying and tagging key data elements in said first data structure, and by storing the tagged key data elements in a structureless format. The mapping template is then applied to the structureless data to map the tagged key data elements from the structureless format into the second data structure. Finally, the mapped data is assembled into the second data structure.

BRIEF DESCRIPTION OF DRAWINGS

FIG. 3 shows an exemplary table field layout for a manifest history and manifest summary dataset which describes the names and maximum sizes of the various fields (in bytes) for each table.

FIG. 4A is an example mapping template for an inbound dataset including a manifest history and a manifest summary.

FIG. 4B is a continuation of FIG. 4A.

FIG. 6 shows an EDI message example of structure rules for a simple one to many relationship.

FIG. 7 shows an example of structure rules for an EDI message with implied looping.

FIG. 8A is an example mapping template for the EDI message dataset of FIG. 7.

FIG. 8B is a continuation of FIG. 8A.

FIG. 9 shows an example of an EDI message with complex looping.

FIG. 10 is an example mapping template for the complex looping inbound dataset of FIG. 9.

FIG. 11 is an example SQL output for the manifest history and summary of FIG. 2 mapped according to the mapping template of FIG. 10.

FIG. 12 shows an example flatfile output and field definition.

FIG. 13 is an example of the tagged inbound data assembled into a structureless format.

FIG. 14 is a high level schematic of the steps involved in conventional SQL processing.

FIG. 15 is a chart showing conventional SQL language syntax components (at top), as well as an example of a simple SQL language script for inserting data into a table.

FIG. 16 is an example template derived output structure showing the precise details on the format of the resulting output structure definitions.

FIG. 17 is an example mapping template for the simple inbound dataset of FIG. 6.

FIG. 18 is a top level overview of all components that make up the mapping template of the present invention (cross-referenced to more detailed figures).

DETAILED DESCRIPTION OF THE PREFERRED EMBODIMENT

Figure 1:
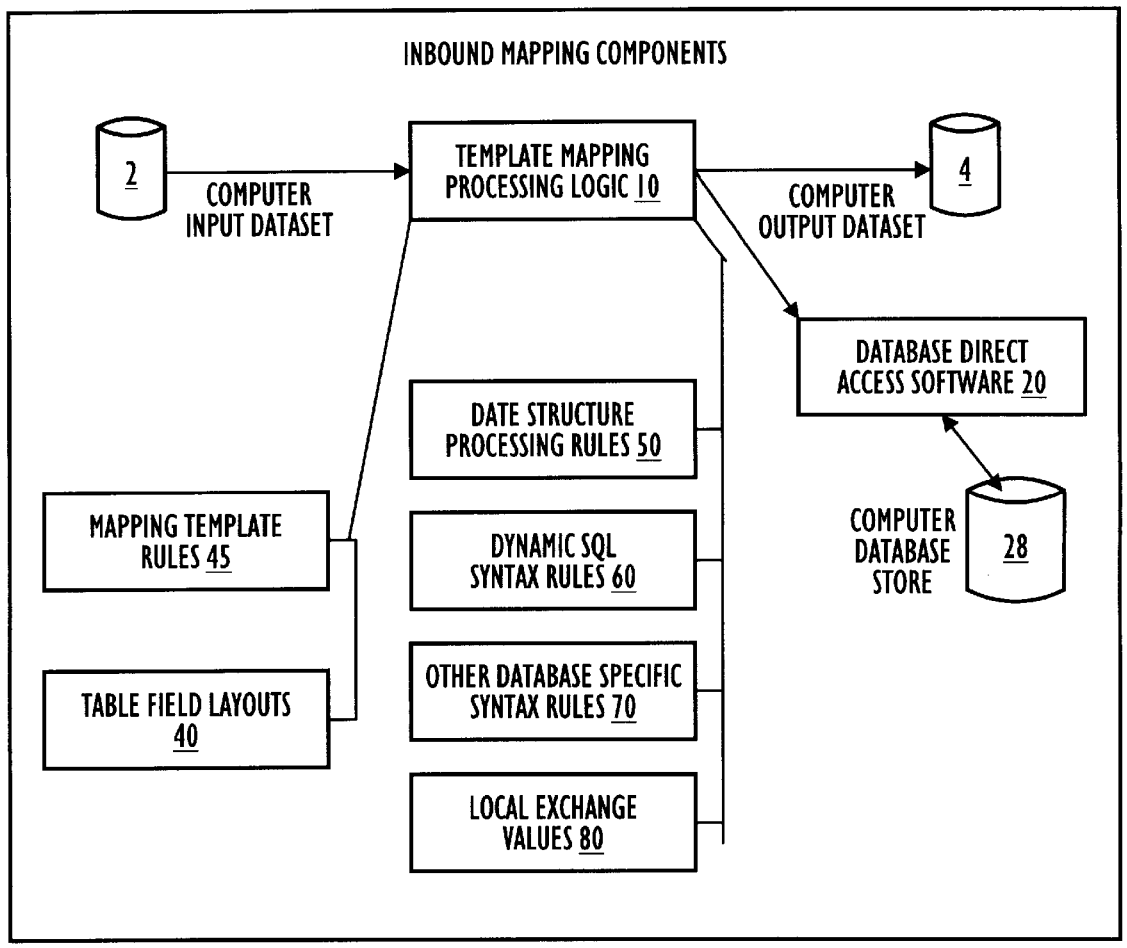
FIG. 1 is a block diagram of the inbound mapping system of the present invention which allows data to be freely received from a host computer and reformatted for use in a host computer system.

The system described below provides a flexible and concise way of mapping between a computer dataset with positionally significant data, and an arbitrary new format required by the user of the method. The new format can include data re-structuring and formatting, or embedding data into dynamic database commands such as SQL or xBase data standards.

The system also allows this mapping to be performed despite only partial information regarding the structure of the original data. The system therefore is ideally suited for, but not restricted to, use in such applications as Electronic Data Interchange (EDI). The following description of the system will be in the context of EDI. However, it should be noted that the system can be used for other purposes, for example, in discontinuous processing associated with Email, forms, data collection systems, etc. The system also provides a mechanism to facilitate the melding of both current major EDI standards (e.g. ASC X12 and EDIFACT), and also combining SQL and EDI syntactical information together. Typical modern computer systems use a combination of SQL, xBase, and Btree based database storage systems. To exchange data between these systems entails using various flatfile formats. There are four types commonly used, flatfile records, a comma delimited file, EDI formats, and SQL syntax statements. (The latter incurs a very high overhead in terms of message size, and so is usually restricted to local transfers and backing up of data only).

The template mapping system of the present invention performs data translation of inbound datasets sent to the host computer from a remote computer system, as well as translation of outbound datasets to be sent from the host to a remote computer system. The invention allows the user to take an EDI message structure and create either a flatfile record format, a comma delimited format, or explicit dynamic SQL statements with embedded data. The latter is the preferred format since these can then be directly passed to the native database system for immediate transfer of the data required. (Other non-SQL database systems such as Btrieve or dBase syntax can be easily substituted). The other two forms are suitable for use with existing data import processes (typical in a mainframe system), while comma delimited formats are specific to xBase database systems import facilities. The invention can also be applied directly for object oriented style schema databases, where the TABLE and COLUMN items within a SQL based data storage can be directly equated to the CLASS and WITH items used in an object oriented data storage system.

To provide a familiar interface to the end-user the template mapping system can be implemented using a metaphor analogous to a spreadsheet, where the user describes the data storage tables, fields, and data elements in a simple and intuitive way. This can be viewed as similar to entering information and formulae into the cells in a spreadsheet. Associated with this is the use of @functions within the mapping template to provide processing decisions and calculation capabilities. (The use of the '@' symbol is merely a unique character delimiter to signal the beginning of a special function name to the mapping template parser). Each @function can optionally have parameters associated with it, or can return an assignment value, and each has a unique computational capability. For instance @IF( ) provides decision making, @D returns a date, @MAP( ) reformats a data item , @NEXTVAL retrieves the next value from a table, and so on. It is intended that implementers of the present invention will extend the available @functions to meet new and specialized needs within the domain of their own product environments.

The fault tolerant data translation of inbound datasets (inbound mapping) sent to the host computer from a remote computer system, and translation of outbound datasets (outbound mapping) to be sent from the host to a remote computer system will now be described.

1. Inbound Mapping

FIG. 1 illustrates the inbound mapping system of the present invention which allows data to be freely exchanged and reformatted between different computer systems. The flexible reformatting is accomplished by decomposing the data elements, tagging key ones, and then reconstructing an outbound dataset based on indexed and tagged key elements. This avoids the torturous prior art system of translating the data into flatfile format, offloading data into a flatfile database, and then translating again into the outbound dataset.

In FIG. 1, the inbound computer dataset 2 represents the incoming information from a remote sending computer's database that is to be received and processed by the host computer. The information may, for instance, include data from purchase orders, invoices and the like, arranged in a structured, application-processable form. The inbound dataset 2 is received directly over a standard communication line.

The inbound dataset 2 is processed by the template mapping system 10 of the present invention, and is thereby restructured and reformatted to be compatible with a receiving computer's database. The receiving computer may be the host computer (in which case the data can be directly downloaded into a computer database store 20 with the help of the existing database direct access software 20 provided by the database vendor), or alternatively, the receiving computer can be another remote computer (in this case, once reformatted in the host, the data can be output in the form of a computer output dataset 4 for transmission to the remote computer).

In order to properly translate the inbound dataset 2, the template mapping system 10 uses two other input components: the mapping template rules 45 and table field layouts 40.

The table field layouts 40 are typically supplied by the sending computer and are dynamically input to the template mapping system 10 for use in processing the input dataset. The table field layouts 40 describe the names and maximum sizes of the various fields (in bytes) for each table. FIG. 3 is a diagram showing the general components of a table field layout (at left) mapped to an actual exemplary table field layout (at right). The table field layout is for a manifest history and manifest summary dataset.

The table definition 150 comprises three components: 1) comments and notes 200 (optional); 2) a table description 300; and 3) field descriptions 400 which provide details of fields within that table. The table definition 150 can be repeated for as many tables as required.

The free-form comments and notes 200 are for documentation purposes. These are ignored by the mapping system.

The table description 300 includes a label identifying the item as a table (see example to right, column 1), a logical table name (column 2), and the coded table name (column 3). The physical table name relates back to the same name used in the mapping template. The logical table name allows a description of the table.

The field descriptions 400 include the field identifier (column 1), the field names (column 2), size (column 3), data format (column 4), and justification parameters (column 5) which may be needed by the mapping process to determine the physical format of the table.

Turning back to FIG. 1, the mapping template rules 45 govern the overall data translation process. These may include field-to-field assignments, and other data manipulations (examples of @ functions used to facilitate such other data exchanges are shown to the right hand side of the template). The mapping template rules form the operating core of the template mapping system 10. They can be provided as an integral part of the template mapping system 10, or they may be imported prior to the translation process. For example, to increase the flexibility of the template mapping system 10 the template mapping rules 45 may be transmitted by the remote sending computer as a precursor to the inbound dataset 2.

The table field layout 40 and mapping template rules 45 are used to build a mapping template, which is then applied to the incoming dataset in the mapping system 10.

FIGS. 4A and 4B are an example mapping template for an inbound dataset including a manifest history and a manifest summary. The template is subdivided into sections each directed to a different item to be translated.

Again, the mapping rules may be prefaced by a series of explanatory comments that generally explain what is to be mapped and how. In the example, the comment block at the head of the template identifies the EDI 856 as the message type, then gives some general examples of function and assignment operation usage within the template. The comments are designed to aid the human reader in interpreting the actions denoted in the subsequent template body and rules.

The mapping rules may be set forth in columns as shown. The illustrated columns include an "item" label to denote the particular item upon which the rules operate, and a "details" column setting forth the rule itself. The items are arranged in succession and include a table identifier that designates the type of table, an index number to uniquely designate the particular table, and key identifiers. The key identifiers denote fields within the data structure that indicate a change of record or level (see FIG. 5 and accompanying explanation). Such key fields can be further subdivided into natural keys within the data structure, and artificial keys that indicate repeated structure elements. For ANSI X12 EDI message standards these include natural keys, (usually found in the very first message segment), and keys within message control segments such as the HL, and LS/LE segments that are added to a message to specifically denote where data loops begin and end. In the message template the EDI_KEY key field(s) are those elements within the message structure that indicate that a new record has occurred when its value changes. This allows the structure of the inbound message to be recursively identified, even if partial or incomplete table field layout 40 is provided. The HL_KEY keys are specific to EDI messages which may contain HL segments, and these (when present) indicate the change of HL level, or record group, within the data structure. It should be noted that the order in which table definitions are added into the template itself can be used to determine the sequential significance of the actual mapped data output in a fault tolerant way. In other words, when performing the processing the natural order of the data occurrences within the data to be mapped will mean that the inner most key value changes will trigger first. This may be the desired result in the output sequencing. However, if not, the data must be cached on the basis of the table definition sequence. Therefore, instead of implementing the last part of a 'write stored data values' operation immediately, these should be deferred by storing the resulting data based on the simple sequence of the table definitions (labelled as 1, 2, 3, etc.). Once mapping at this first pass is complete, a second pass is then necessary to process the actual data in the sequence 1, 2, 3, etc. This two level processing is only required where sequence is critical. Normally, this is not the case, and the extra complication can be avoided. The regular key ordering can be used to guarantee that referential integrity of one to many relationships within the data is not compromised by processing the 'many' items before the 'one' item.

The particular fields of the table are then set forth by label, and the field reassignments or operators immediately follow. Various types of assignments can be indicated. A simple example is shown by the 'mnfst_no' field, into which is assigned the value from the BSN02 EDI element. Another example is the 'ts_date' field which is assigned the value from the date function @DYYMMDD. The latter is a direct value not related to any incoming message element. A complex example is shown by the field rule for 'generator_id' which uses an @IF function and shows how a conditional assignment is implemented. In this case, the N101 EDI element is compared to the value 'SF'. If it matches, then the value from N104 EDI element is assigned into the field 'generator_$_{id}$'. The "S" element used as prefixes indicates the rule applies to the HL "S" segment to be processed. Field 'Reject_flag' is assigned from the &&edi_valid_flag which is in a memory storage area which indicates the status of the translation process.

In addition to the two input components (the mapping template rules 45 and table field layouts 40), the template mapping system 10 uses a number of resident components that are maintained in the receiving computer system to help accomplish the dataset translation procedure. As shown in FIG. 1, these include data structure algorithm rules 50, dynamic SQL syntax rules 60, other database-specific syntax rules 70, and local exchange values 80.

The data structure process rules 50 consist of rules within the template mapping system that determine how specific data structure elements are handled by the mapping process. These known rules define how to handle the structures of the data, and how to recursively recognize and process the specific structures contained in it; this is intrinsically fault tolerant.

Figure 5:
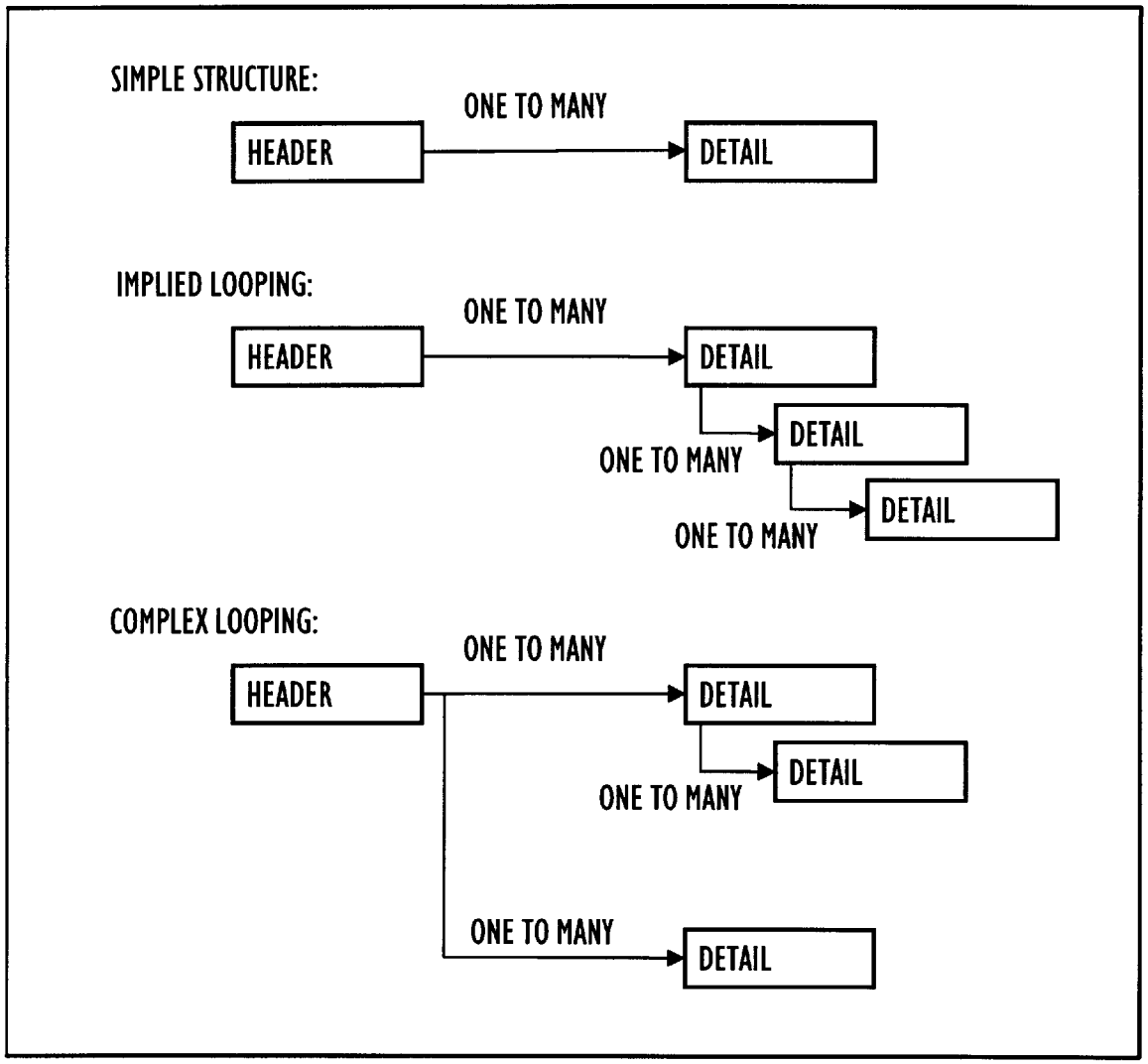
FIG. 5 is a flow chart of the three basic types of EDI message structure.

FIG. 5 is a flow chart of the three basic types of EDI message structure. These include simple structure (top) wherein each message includes a number of direct data elements.

FIG. 6 shows an EDI message example of structure rules for a simple one to many relationship (between the V1 segment and the R4/NV9 segment pairs). FIG. 17 is an example mapping template for a simple inbound dataset.

The EDI message may also include implied looping (see FIG. 5, middle). FIG. 7 shows an example of structure rules for an EDI message with implied looping. A data element representing a top level of detail may have multiple detail segments associated with it in loops, and each of these may also map to other data elements containing deeper levels of detail, and so on (compare to the simple looping in FIG. 6 notice the multiple N3 and N10 segments can occur multiple times in implied loops). FIG. 8A and 8B are an example mapping template for an implied looping dataset.

Finally, the EDI message may include complex looping (see FIG. 5, bottom). FIG. 9 shows an example of structure rules for an EDI message with complex looping. This is a hybrid of the previous two EDI message types. The previously discussed mapping template of FIGS. 4A and 4B are an example mapping template for an inbound dataset including complex looping (in FIGS. 4A and 4B are, HL segments provide complex looping structures, c.f., FIG. 9 where the VID/N10 segments provide an implied loop example).

Referring back to FIG. 1, the template mapping system 10 also uses dynamic SQL syntax rules 60. The American National Standards Institute maintains a standard language for accessing databases. This is called structured query language (SQL). Software programs may access SQL compliant databases by use of dynamic SQL statements embedded in the memory of the computer. Dynamic SQL allows real time accessing. The template mapping system 10 of the present invention can take advantage of widely available SQL integration tools kits such as those based on the industry wide ODBC (Open DataBase Connectivity) standard originally adopted by Microsoft and IBM. These make available a complete set of dynamic SQL statements and syntax rules 60. Alternately the template mapping system 10 could be optimized to work specifically with a select set of database types, such as the xBase standard, a widely used PC based standard, by building the structure rules that apply to accessing data within an xBase database. (xBase database standard defines the content of the header record within the database, and the data records and their field elements, and how to access the data, add, delete, and update records).

The template mapping system 10 also uses other database-specific syntax rules. These are miscellaneous syntax rules that are specific to particular database formats, such as dBase (Borland's database standard).

Finally, the template mapping system 10 employs local exchange values that are defined locally to equate to different external values. For example, the local exchange value K may be assigned to designate kilograms, whereas the external designation is KG.

Given the above-described inputs and infrastructure, the template mapping system 10 is capable of performing a robust, flexible translation of a fixed-structure inbound dataset into a different outbound dataset in the following manner.

2. The Method of Inbound Translation

The method of using the architecture described above includes two general steps: 1) decomposing the inbound data into discrete data elements and tagging the key elements; and 2) deducing the outbound structure of the data based on index key elements and assembling the final data product accordingly. The detailed steps for accomplishing this are explained below:

i. Open the inbound dataset (to be mapped), identify the type of document and verify that a mapping template exists for this type of document so that it can be processed.

ii. Load mapping template

The appropriate mapping template is loaded into memory and memory-storage locations are defined and reserved for the following information:

| | | |
|---|---|---|
| key_value | (number, key, value) | loop trigger keys (these indicate to the process that a level trigger value has been detected). |
| data_values | (key, value) | tagged data values |
| line_values | (key, value) | used for embedded data outputs (this stores the raw 'Field' line read from the mapping template 10 file). |
| line_element | (value, number) | used for embedded data outputs (this locates the position of the element in the output record format) |
| current_table_name | (value) | holds the name of the table that data is currently for. |
| table_store | (name, table, type, index, sequence) | Holds details of the tables within the mapping template. |
| table_defs_store | (table, field, size, format, justify, sequence) | used for none database tables |
| table_key_store | (table, element, loop_id, key value) | Tables key elements |
| mapping_rules | (table, column name, element, loop_id, rule, rule_type, position) | |
| table_mode_rule | (table, mode, element, value) | Update/Append indicator |
| table_data | (element, loop_id, table, column name, data) | retains incoming data for a table. | iii. Then for each record within the incoming dataset, read each one, one at a time, and do the following:

a. Load each data element into the data values store (data values), and tag it with its associated data tag, table and field address from the mapping template rules 45 described above.

b. Next determine if a control key value changed (by cross-referencing by element ID name into the key_value store), or if an end of data set marker has been encountered. If so, determine which tables are affected by either event by checking the index elements (held in the key_value store) against the control key value that changed (an end of data set marker triggers all tables for processing, a key change, only those tables for that key).
c. For each such table in step iii(b), build the complete output record in the following way:
 1) check the index values in the incoming data structure (index columns) by doing the following:
  lookup the index elements for the current table in the table_key_store and
  check that the index elements have data associated with them in the data_values store,
  if not, look for a mapping rule for this element (mapping_rules store), and use it to create a data value; then put that value into the data_values store. (Otherwise if no mapping rule, report user error in defining the table template)
 2) populate the other data columns in the data structure by doing the following:
  loop through each of the mapping rules for this table in the mapping_rules store,
  if no value is stored in the data_values store for that element, (therefore this element does not come from any segment within the inbound message) instead apply matching mapping rule for that element name. To do this lookup and perform mapping rule to determine a value and save that new value to data_values store. (Example: for the element 'ts_date' the mapping rule is [ ts_date , @DYYMMDD ] which assigns the current date value into the transaction date element).
 3) determine the write access mode to the physical data store:
  if desired output is to be placed into a database, check if updates are permitted when key values already exist in the database: p4 if desired output is to be placed into a flatfile, determine if appending to existing file or writing to a new file.
 4) write stored table data values by doing the following:
  if output is to a database, examine database table definition and for each column, retrieve data from data values store and embed into a dynamic database access statement. FIG. 11 is an example SQL output for the manifest history and summary of FIG. 2 mapped according to the mapping template of FIGS. 4A and 4B. This shows how the field names are listed in the SQL statement, followed by the actual values for those fields calculated by the template.
  if output is to a flatfile, examine table definition. See FIG. 12 for an example flatfile output for the manifest history and summary of FIG. 2 mapped according to the mapping template of FIGS. 4A and 4B. This shows how only the data values are now output, but in a fixed length columnar format, one calculated value after another. Line wrapping has occurred since only 80 columns can be shown across the page).
  for each column, retrieve data from data values store and determine its offset within the data record, then build data output line accordingly;
  lastly execute the dynamic database access statement, or store data line to flatfile depending on which output type is being processed.

To do this, it is necessary to output the outbound dataset to host database or remote computer, and to output the result as a computer output dataset 4 for sending to another remote computer system or hand-off to database direct access software 20 for managed storage in the host computer database store 28. If the output is to a database, the mapping system 10 checks to insure that updates are permitted when key values already exist in the database (this is necessary to accommodate those database or data storage systems that do not support direct update operations). The dataset is then built accordingly, and the dynamic SQL "access" statement is executed to append the data. If the output is to a flatfile, the mapping system 10 determines if the output dataset should be appended to an existing file or written to a new file. Again, the dataset is built accordingly, and the data lines are stored.
 5) clear table values:
  once processing on all tables for this event is complete, then flush the data_values store. This is done by clearing the table_data storage location. Once the table_data storage location is cleared, the mapping template system 10 is ready to proceed to the next table to be translated. All tables are translated in this manner. When all tables have been processed, the data_values location is cleared. All records are processed in this manner until a data end marker is detected.
v. Continue processing the data set to be mapped, reading each record, until end of all data is detected. At this point, the inbound mapping process is completed.
vi. (optional) Error Correction
 As a general principle of good programming practice error handling should be implemented within the template mapping process. This is currently done as a set of in memory stores that identify error conditions throughout each step of the processing, and then return these status indicators to the overall mapping template control logic to determine the required action. This flexibility is consistent with the philosophy of the template mapping method, in contrast to the current state of the art in which data translation aborts when seemingly critical end conditions are met.

3. Outbound Mapping

Figure 2:
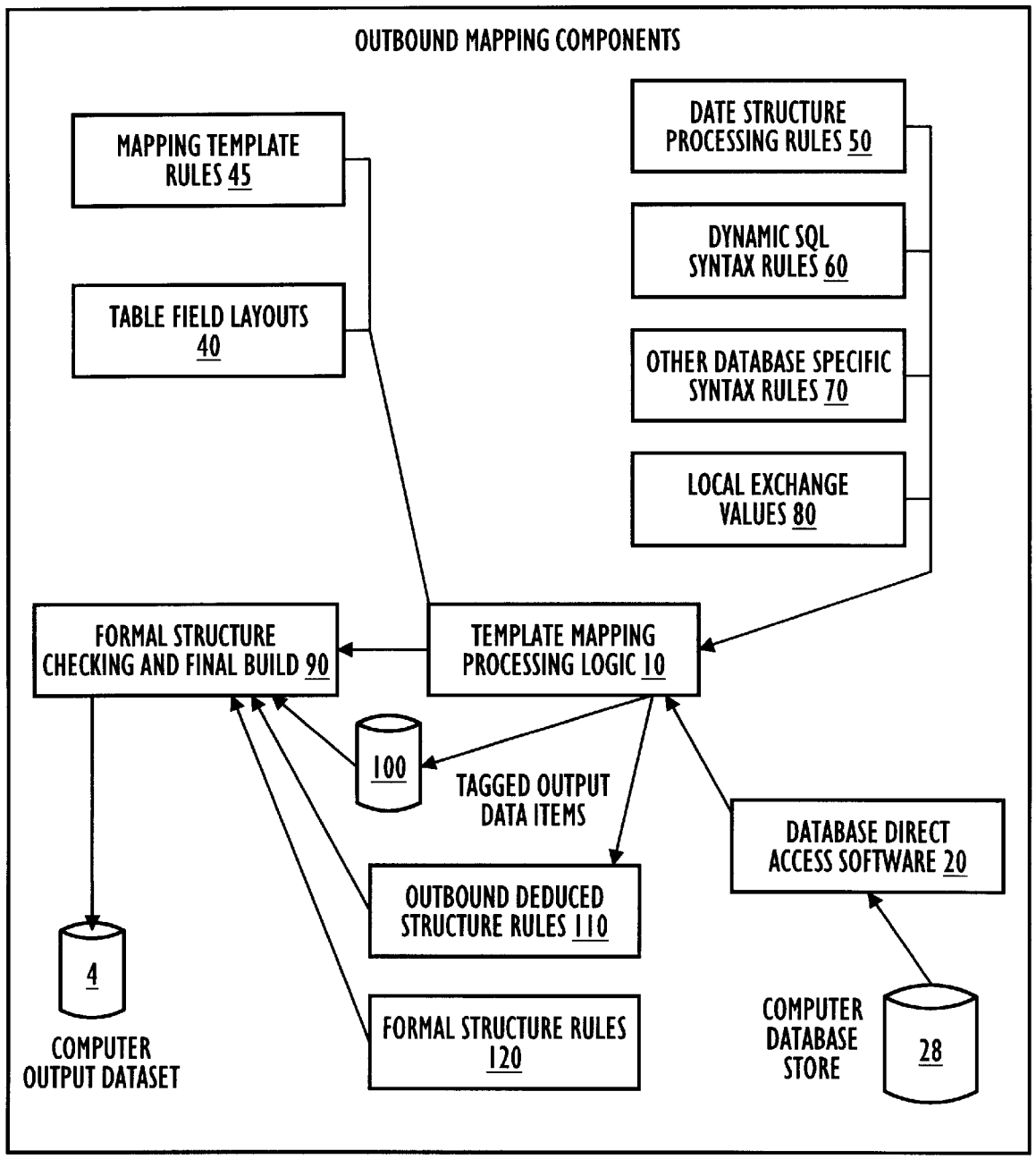
FIG. 2 is a block diagram of the outbound mapping system of the present invention which allows data to be freely reformatted for transmission and use in a remote computer system. Like components and devices explained above with regard to FIG. 1 are similarly designated.

FIG. 2 illustrates the outbound mapping system of the present invention which allows data to be freely reformatted and sent to a different computer system. Like components and devices explained above with regard to FIGS. 1 and 3–17 are similarly designated.

In this case, the template mapping system 10 of the present invention must first access the relevant data from a host computer database store 28. This is accomplished by an accessing script 20 of dynamic SQL statements that is directly utilized during the mapping template process.

As before, the information may, for instance, include data from purchase orders, invoices and the like, arranged in a structured application-processable form, and not necessarily always a database.

The host data is processed by the template mapping system 10 of the present invention, and is thereby restructured and reformatted into an outbound dataset that will be compatible with the receiving computer and database. The processing performed by the template mapping system 10 is generally similar to that already described for the inbound process except that the mapping template is now used to both extract data from database tables, and also to deduce the required positionally significant data format to be constructed. Once reformatted, the data is output in the form of a computer output dataset 4 (i.e. EDI for transmission to another computer).

It is noteworthy that the template mapping system performs the data extraction from the host database store 28 based on the information given in the table definitions and mapping template. In contrast, prior art systems required custom programming to build a data extraction module.

In order to properly translate the host database store 28, the template mapping system 10 uses the same two input components: the mapping template rules 45 and table field layouts 40 as described above. In addition, the same resident components are maintained in the host computer system to accomplish the dataset translation procedure. The resident components include data structure algorithm rules 50, dynamic SQL syntax rules 60, other database-specific syntax rules 70, and local exchange values 80 (all as explained).

4. The Method of Outbound Translation

This method is conceptually the same as that already described for the inbound process except that the mapping template must now be used to both manipulate and extract data from database tables, and also to deduce the required positionally significant outbound data format to be constructed.

The method of using the architecture described above for outbound translation includes the following steps:

1. Loading mapping template

The mapping template is loaded into memory storage locations that are defined and reserved for the same information described with regard to the inbound data translation, but these now control the outbound translation. Whereas before the mapping template described the incoming data structure, it is now used to deduce the outbound data structure. (A number of new memory storage locations are also required for items specific to describing the outbound data structure, and these are detailed at the start of the processing logic description which follows this section).

2. Assembling and Formatting of outbound data

The format of the originating stored data may not necessarily match the outbound structure. In order to accommodate such structure clashes efficiently it is necessary to assemble the data items into a structureless format. This structureless format achieves two goals; firstly, it makes extract of the outbound data uncomplicated by allowing extraction in a way that is natural to the original data structure, and; second, it allows control of the final structure using the mapping template rather than it having to be pre-determined and built (as is the case with the current state of the art). The structureless format uses a record prefix to label each data item to be used in the final output (see FIG. 13 for example).

When the outbound data is stored in a SQL database the data extraction from the dataset 4 can be achieved using dynamic SQL statements directly from access software 20 to retrieve the data from the computer database store 28 (see FIG. 11, for instance). Such dynamic SQL statements can be deduced directly using the mapping template table definitions and key field definitions to determine the required database access data select statements. (In the current state of the art all such data accesses must be specifically pre-programmed before hand). The present method uses the template mapping key fields to determine the sequence and order in which data is read. While the sequence in which tables are defined and key field definitions within the mapping template establish the referential relationships between tables. Once the data records have been retrieved from the database storage each data element is then specifically labelled with two tags. The first of these is the key value tag which is built by combining together the values from the table access keys (from the mapping template definition) into one fixed length contiguous string. The second item tag is the actual data element name within the outbound structure. On change of key value the record prefix is updated accordingly, and any referential table accesses are also performed (i.e. a referential lookup could be using 'person id' to look up 'surname' in a 'people' table where surname is not available in the main table data items). Alternatively for non-SQL based systems records are directly extracted from data store 28 and the data is tagged in the same way but now the data must be output into an intermediary file and sorted on the key value tag. This sorting will insure that items required for the same output record structure are grouped together (because dynamic data access statements are not available, this data extraction will have to be pre-coded). Building the data in this structureless way means that the extraction process can be greatly simplified since it does not have to retrieve data and format it into the exact sequence of the outbound data structure (see example of FIG. 13).

3. Defining outbound dataset structure.

The outbound data structure is defined according to the following steps:

i. Select the first table definition from within the mapping template, select the data element tag names from the key definition section. These are the main identifier segments, ordered by key sequence that will make up the outbound message structure (i.e. refer to FIG. 4 tags BSN, HL, LIN). So for each of these key elements you will expect to need a matching segment in the outbound message structure format.

ii. Lookup like named tags within the mapping template field definitions to determine each complete set of elements for each of the key element items message structure segments. (i.e. refer to FIGS. 4A and 4B for the PID segment there will PID01, PID03 and PID04 elements).

iii. Lookup the remaining none key segment tags within the table template. These represent additional segments within this block. This completes identification of structure segments for the initial message structure, and group them relative to the key elements within the message template.

iv. Select the next table definition and compare the key field definitions. Ignore those tags already handled previously. Any remaining tags denote the loop structure for the next section of the message. Proceed as before to build segment definitions for these and then the remaining none key segment tags. Continue until all table definitions in the mapping template are included. Note: When performing this for existing ASC X12 EDI message structures you may get conflicting results. This is because some EDI message structures are not in compliance with structured data rules for relational data. Consequently segments in the ASC X12 standard can occur out of sequence. In these cases for strict message compliance you can simply add special local rules to accommodate these inconsistencies when generating the structure. (Another alternative is to simply substitute the default ASC X12 structure manually, instead of creating it dynamically). Refer to FIG. 16 for precise details on the format of the template derived output structure definitions.

4. Output data formatting

The structureless data store (as in FIG. 13), sorted by the record prefix key (created in step 2), is now used as input to the outbound record structure build process. Each record is read in turn, and the data tag name (also added at step 2) is used to locate the data item in the correct position in the matching outbound segment (split the record data into its three component pieces, the key prefix value, the data tag value, and the actual data value itself, refer to FIG. 13 for example of tagged data). Store the three components into the element_data storage area. The outbound structure definition is thus built one outbound segment element at a time. If a control key_value changes within the record prefix key, or if an end of data set marker has been encountered, then determine which segments are affected by either event by checking the index elements (from step 1) against the control key_value that changed (an end of data set marker triggers all segments for processing, a key change, only those segments for that key).

The detailed step-by-step process for completing the output data formatting process (taken by the data mapping system 10 to manipulate the tagged data store information according to the layout specified by the required output structure in step 3) is as follows:

i. Build the outbound structure definitions and establish memory storage areas with the following attributes:

| | | |
|---|---|---|
| a) segment_structure | (edi segment, current_key, loop level, segment name, segment type, maximum use, maximum occurs, loop reference, pair indicator) | This store holds the high level detail for each output record segment |
| b) segment_tracking | (Segment Type, Level) | Tracks current segment and message level |
| c) current_loop | (integer) | Translation of segment rules load. |
| d) level_ID | (integer) | Database of actual segment levels. |
| e) seg_header | (string, string, string) | Matches the segment header line outbound segment detail rules. |
| f) seg_elements | (integer) | Count of segment rules load. |
| g) pair_indicator | (char) | Pairing of segment rules to a loop (This denotes when two adjacent segments actually constitute an implied loop pair, i.e. a header to detail, one-to-many construct). |
| h) element_detail | (edi element, field id, minimum length, maximum length, Type Ind, Field Type, Field Name, Field Reference, Database Name, Database Field) | Rules pertaining to element within a segment. |
| i) element_data | (key, edi element, data) | Tagged data for translation. |
| j) out_line | (string) | Current completed outbound line detail |
| k) out_keys | (integer) | Stores number of keys on outbound data, Sets up size of keys on outbound data. |
| l) out_key_fields | (string, integer, integer) | Keys for outbound structure |
| m) previous_key | (string) | Current tagged data key for translate |
| n) number_of_loops | (integer) | Number of segment loops to process |
| o) loop_levels | (integer, integer) | Current segment and loop level |
| p) loop_count | (integer, string, integer) | Segment loop identification & count | ii. Open the output tagged data already created, then for each record within the data proceed as follows:
  a. split the record data into its three component pieces, the key prefix value, the data tag value, and the actual data value itself. (see FIG. 13 for example)
  b. store the three components into the element_data storage area
  c. check the key value with the previous value, if it has changed then select the old key value and do the following:
    (1) begin the primary level loop, until all structure segments at this loop level have been processed
    (2) retrieve the current structure loop level from the level_id store lookup and (3) save the first segment structure type for that loop level
  d. now for all segments and stored data at that loop level do the following:
    (1) begin the secondary level loop, until all details for these segments are completed lookup the next segment structure type, and the syntax details from segment structure stored details
    (2) begin tertiary level loop, until all details for this segment are completed
  e. now for all elements within that segment write the stored tagged data in the following way
    (1) if pair indicator is "no", then lookup tagged data for that tagged write output to completed outbound dataset.
    (2) if pair indicator is "yes", then loop writing all information for that segment BEFORE moving onto the next segment within the structure.
  End tertiary level loop
    f. repeat process for all structure segments at that loop level.
  End secondary level loop
  End primary level loop
    c. Continue until all records have been processed from the tagged data set.

6. Error Correction

This whole last phase of the process also provides for self checking error reporting. This is done through comparing the data found in the element store (selected from the tagged data records) with the actual definition rules in the element and segment structure definitions. If a required element is blank or of invalid data length or type, then an error can be indicated accordingly.

Just as with inbound data processing, the template mapping system 10 is capable of performing a robust, flexible translation of a fixed-structure inbound dataset into a different outbound dataset.

FIG. 18 is a summary checklist of all of the above-described components that are incorporated in the mapping system 10 of the present invention. A brief explanation of each is given along with a reference to the figure(s) which portray the component in more detail.

Having now fully set forth a detailed example and certain modifications incorporating the concept underlying the present invention, various other modifications will obviously occur to those skilled in the art upon becoming familiar with said underlying concept. It is to be understood, therefore, that within the scope of the appended claims, the invention may be practiced otherwise than as specifically set forth herein.

I claim:

1. A device for transferring information, comprising:

a first computer system operating with data structured according to a first protocol;

a second computer system operating with data structured according to a second protocol;

first communication means for accessing a dataset from said first computer system in said first protocol;

a template mapping system for extracting information from said dataset;

means, using said template mapping system, for restructuring said information according to said second protocol in a second dataset; and second communication means for transferring said second dataset to said second computer system.

2. The device according to claim 1, wherein said first and second communications means operate discontinuously.

3. The device according to claim 1, further comprising means for storing into computer-readable media data structured according to said second protocol in said second computer system, wherein said second protocol is unknown at a time which said first protocol is defined.

4. The device according to claim 1, wherein said first and second communications means operate on a plurality of transactions.

5. The device according to claim 4, wherein said plurality of transactions consists of at least two transactions.

6. A method for electronic data interchange between a first computer system operating with a first dataset comprised of data elements in a first format structured according to a first protocol, and a second computer system operating with a second dataset comprised of data elements in a second format structured according to a second protocol, a first template which identifies and describes data elements of the first format, a second template which identifies and describes data elements of the second format, and a mapping template which restructures datasets in the first format into datasets structured in the second format, the method comprising the steps of:

receiving the first dataset from the first computer system;

identifying the first format and determining the corresponding first template where the corresponding template may be received with the first dataset;

identifying the second format and determining the corresponding second template;

using the first template to identify data elements in the first dataset according to the first protocol;

defining a fixed structure memory location according to the corresponding data element descriptions in the first and second templates;

using the second template to identify which data elements in the first dataset either have corresponding data elements in the second format or are needed to generate data elements in the second format;

tagging said identified data elements of the first dataset;

applying the mapping template to said tagged data elements of the first dataset and the second template to the first dataset to create a second dataset according to the second format and to store the second dataset in the fixed structure memory location.

7. The method according to claim 6, further comprising the step of providing a fault tolerant first protocol.

8. The method according to claim 7, further comprising the step of recursively identifying from the mapping template and the first dataset information regarding the full comprised structure of the first protocol.

9. The method according to claim 6, wherein said applying step further comprises the step of organizing the data elements of the second dataset in completely different data segments from the data segments of the first dataset.

10. The method according to claim 6, further comprising the step of assisting the mapping template by using said fixed structure memory location to manipulate said tagged data elements.

11. A method for translating data between a first data structure and a second data structure, the method comprising the steps of:

creating a mapping template including table layout fields describing the first data structure and the second data structure, and mapping template rules defining how data is mapped therebetween;

loading into computer-readable media a first data set formatted according to said first data structure;

loading into computer-readable media said mapping template including said table layout fields describing said first data structure and said second data structure, and said mapping template rules defining how data is mapped therebetween, wherein said mapping template either has been previously stored in computer-readable media or is obtained with said first data set;

identifying and tagging key data elements in said first data structure;

storing said tagged key data elements in a structureless format into computer-readable media; and applying said mapping template and said mapping template rules to the tagged key data elements to directly map said tagged key data elements from said structureless format into said second data structure and to generate data elements, if any, that are present in the second data structure but absent in the first data structure by processing data elements from the first data structure and mapping the generated data elements into said second data structure.

12. The method according to claim 11, further comprising the step of providing a fault tolerant first protocol.

13. The method according to claim 12, further comprising the steps of:

mapping extended data elements in said first data_set to said second data_set with said first protocol; and storing said second data set into computer-readable media.

14. The method according to claim 12, further comprising the steps of;

mapping a partially incomplete first data_set to the second data_set with said first protocol; and storing said second data set into computer-readable media.

* * * * *